United States Patent
Savoj et al.

(10) Patent No.: US 7,884,649 B1
(45) Date of Patent: Feb. 8, 2011

(54) SELECTION OF OPTIMAL CLOCK GATING ELEMENTS

(75) Inventors: Hamid Savoj, Los Altos Hills, CA (US); David Berthelot, Santa Clara, CA (US)

(73) Assignee: Magma Design Automation, Inc., San Jose, CA (US)

( * ) Notice: Subject to any disclaimer, the term of this patent is extended or adjusted under 35 U.S.C. 154(b) by 94 days.

(21) Appl. No.: 12/395,268

(22) Filed: Feb. 27, 2009

(51) Int. Cl.
*H03K 19/00* (2006.01)

(52) U.S. Cl. .......................... 326/93; 326/98; 327/544; 713/320

(58) Field of Classification Search .................. 326/93, 326/95, 98; 327/544; 713/320
See application file for complete search history.

(56) References Cited

U.S. PATENT DOCUMENTS

| | | | |
|---|---|---|---|
| 5,025,387 A | | 6/1991 | Frane |
| 6,204,695 B1 * | | 3/2001 | Alfke et al. .................... 326/93 |
| 6,473,890 B1 * | | 10/2002 | Yasui et al. .................. 327/141 |
| 6,552,572 B1 * | | 4/2003 | Cheung et al. ................. 326/93 |
| 6,636,074 B2 * | | 10/2003 | Schulz .......................... 326/93 |
| 6,658,635 B1 * | | 12/2003 | Tanimoto ..................... 716/108 |
| 7,080,334 B2 * | | 7/2006 | Fan et al. ..................... 716/103 |
| 7,095,251 B2 | | 8/2006 | Wilcox et al. |
| 7,418,675 B2 * | | 8/2008 | MacDonald et al. ......... 716/134 |
| 7,484,187 B2 * | | 1/2009 | Eisner et al. ................. 716/134 |
| 7,594,200 B2 * | | 9/2009 | Eisner et al. ................. 716/134 |
| 7,605,612 B1 * | | 10/2009 | Chiang et al. ................. 326/93 |
| 2004/0150427 A1 * | | 8/2004 | Wilcox et al. ................. 326/93 |
| 2006/0248487 A1 * | | 11/2006 | Kapoor et al. .................. 716/6 |
| 2008/0301593 A1 * | | 12/2008 | Jiang et al. ..................... 716/2 |

OTHER PUBLICATIONS

Hurst. "Automatic synthesis of clock gating logic with controlled netlist perturbation." Proceedings of DAC, Jun. 8-13, 2008, Anaheim, CA, pp. 654-657.

* cited by examiner

*Primary Examiner*—Jason M Crawford
(74) *Attorney, Agent, or Firm*—Adams Intellex, PLC

(57) ABSTRACT

Techniques in which an optimal set of clock gating elements is determined for a selected circuit design. Those clock gating elements are coupled to selected flip-flops, with the effect that those selected flip-flops will consume less dynamic power during operation of the logic circuit. The selected set of clock gating elements provides an optimal savings in overall power consumption after modification of that selected circuit design.

9 Claims, 2 Drawing Sheets

SELECTION OF OPTIMAL CLOCK GATING ELEMENTS

BACKGROUND

Figure 1:
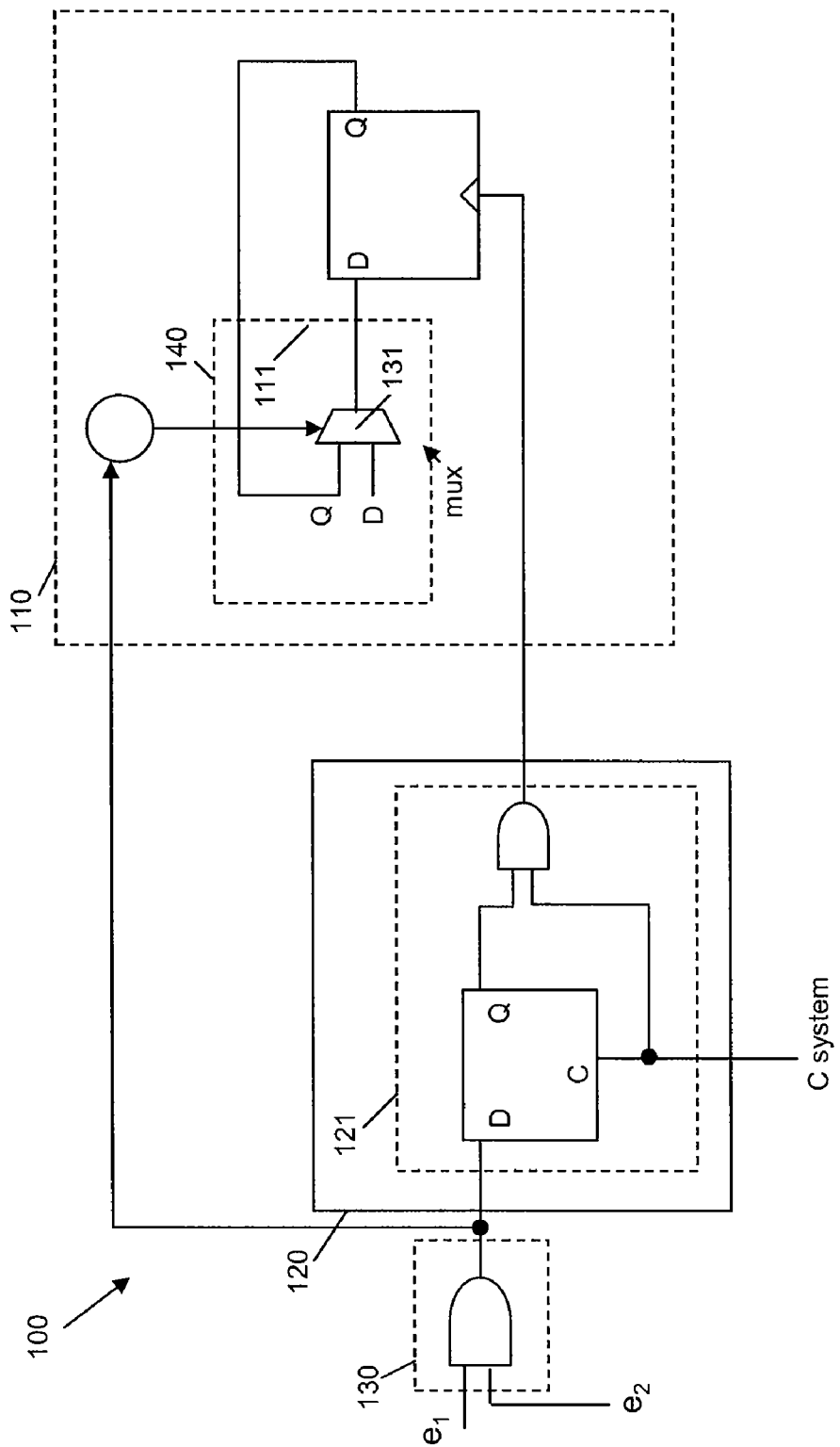

A logic circuit design might incorporate one or more flip-flops, and related types of circuits, such as buffers and registers. These circuits are each generally capable of maintaining one bit of memory from time to time during operation of the logic circuit, typically including a clock input C, a data input D, and a data output Q. The flip-flop is disposed so that when the clock input C is changed, the data input D is stored in the flip-flop, with the effect that the value of data output Q will be set, on the next cycle of the clock input C, to the value of data input D. This has the effect that a new value $D_{t+1}$ stored in the flip-flop after clocking might or might not change from its old value $D_t$, depending on the input to the flip-flop.

Due to the design of these circuits and the nature of the transistors used in that design, each of those flip-flops consumes dynamic power when clocked, even when their maintained memory bit remains unchanged. This has the effect that, if selected flip-flops are disabled when their memory bit maintained remains unchanged, those selected flip-flops should consume less dynamic power during operation of the logic circuit.

SUMMARY OF THE DESCRIPTION

The description includes techniques, including apparatuses and methods, in which, for a selected circuit design, an optimal (or near-optimal) set of clock gating elements is determined for that selected circuit design. Those clock gating elements (sometimes referred to herein as "ICG's") are coupled to corresponding ones of those selected flip-flops, with the effect that those selected flip-flops will consume less dynamic power during operation of the logic circuit. However, those clock gating circuits themselves consume at least some dynamic power during operation of the logic circuit, as well as requiring additional circuit space and wiring to be incorporated into the logic circuit design.

The selected set of clock gating elements provides that, after that selected circuit design has been modified to include those clock gating elements, an optimal (or near-optimal) savings in overall power consumption by that selected circuit design. This power savings is primarily derived from disabling selected flip-flops within that selected circuit design, with the effect that those flip-flops do not consume dynamic power for switching when disabled.

This has the effect that the clock gating elements reduce dynamic power (and possibly static power) consumption, as well as providing opportunities for logic optimization in that selected circuit design. This also has the effect that any additional power consumption by those clock gating elements (and any other additional logic elements needed to incorporate those clock gating elements and couple them to appropriate flip-flops) does not overmatch the power consumption savings derived from adding those clock gating elements to that selected circuit design.

DETAILED DESCRIPTION

Nature of the Description

Read this application in its most general form. This includes, without limitation:

References to specific structures or techniques include alternative or more general structures or techniques, especially when discussing aspects of the invention, or how the invention might be made or used.

References to "preferred" structures or techniques generally mean that the invenfor contemplates using those structures are techniques, and think they are best for the intended application. This does not exclude other structures or techniques for the invention, and does not mean that the preferred structures or techniques would necessarily be preferred in all circumstances.

References to first contemplated causes or effects for some implementations do not preclude other causes or effects that might occur in other implementations, even if completely contrary, where circumstances would indicate that the first contemplated causes or effects would not be as determinative of the structures or techniques to be selected for actual use.

References to first reasons for using particular structures or techniques do not preclude other reasons or other structures or techniques, even if completely contrary, where circumstances would indicate that the first structures or techniques are not as compelling. The invention includes those other reasons or other structures or techniques, especially where circumstances would indicate they would achieve the same effect or purpose as the first reasons, structures, or techniques.

In this application, each flip-flop's maintained memory bit is generally associated with its data output Q, and each flip-flop is considered to be disabled when its clock input C is held stable, i.e., does not change or have a transition time (neither a down transition nor an up transition). However, in the context of the invention, there is no particular requirement for any such limitation.

FIGURES AND TEXT

FIG. 1

FIG. 1 shows a conceptual diagram of a circuit.

A circuit 100 includes elements as shown in the FIG. 1, including at least a selected circuit design 110, that selected circuit design 110 having one or more flip-flops 111 (sometimes referred to herein as "flops"). The circuit 100 includes a set of one or more clock gating elements 120, each including at least some logical circuit elements 121. The logical circuit elements 121 might be instantiated from a circuit library, e.g., one or more standardized circuits for ICG's, or might be built including a latch and an AND gate, as shown in the FIG. 1. The circuit 100 possibly also includes a set of logic circuitry 130 capable of disabling or enabling one or more of the flip-flops 111. The logic circuitry 130 might include combinational logic, sequential logic, some combination or conjunction thereof, or some other type of circuit, and might use one or more clock gating elements 120 coupled to corresponding flip-flops 111. In some cases, it might be desirable to include one or more flip-flops or multiplexers 131 in addition to those found in the selected circuit design 110 as part of the logic circuitry 130.

Dynamic Power Savings

In the circuit 100, there are at least three primary contributors to power consumption for any selected circuit design 110, as modified by inclusion of one or more clock gating elements 120 and possibly other logic circuitry 130. These might include one or more of, or some combination or conjunction of, the following:

reduction of dynamic power consumption from disabled flip-flops 111;

reduction of dynamic power consumption from logic optimization after inclusion of clock gating elements 120 and possibly other logic circuitry 130 (e.g., including, for example without limitation, a multiplexer 131 or other circuit elements) in the selected circuit design 110;

increase in dynamic power consumption from use of clock gating elements 120 and possibly other logic circuitry 130 in the selected circuit design 110;

In one or more cases, total reduction of power consumption can be expressed as:

$$G = P_1 + P_2 - P_3 \quad (191)$$

where, in equation (191),

G=total reduction in power consumption;

$P_1$=reduction of dynamic power consumption from disabled flip-flops 111;

$P_2$=reduction of dynamic power consumption from logic optimization after inclusion of clock gating elements 120 and possibly other logic circuitry 130 in the selected circuit design 110;

and $P_3$=increase in dynamic power consumption from use of clock gating elements 120 and possibly other logic circuitry 130 in the selected circuit design 110.

FIG. 2

Figure 2:
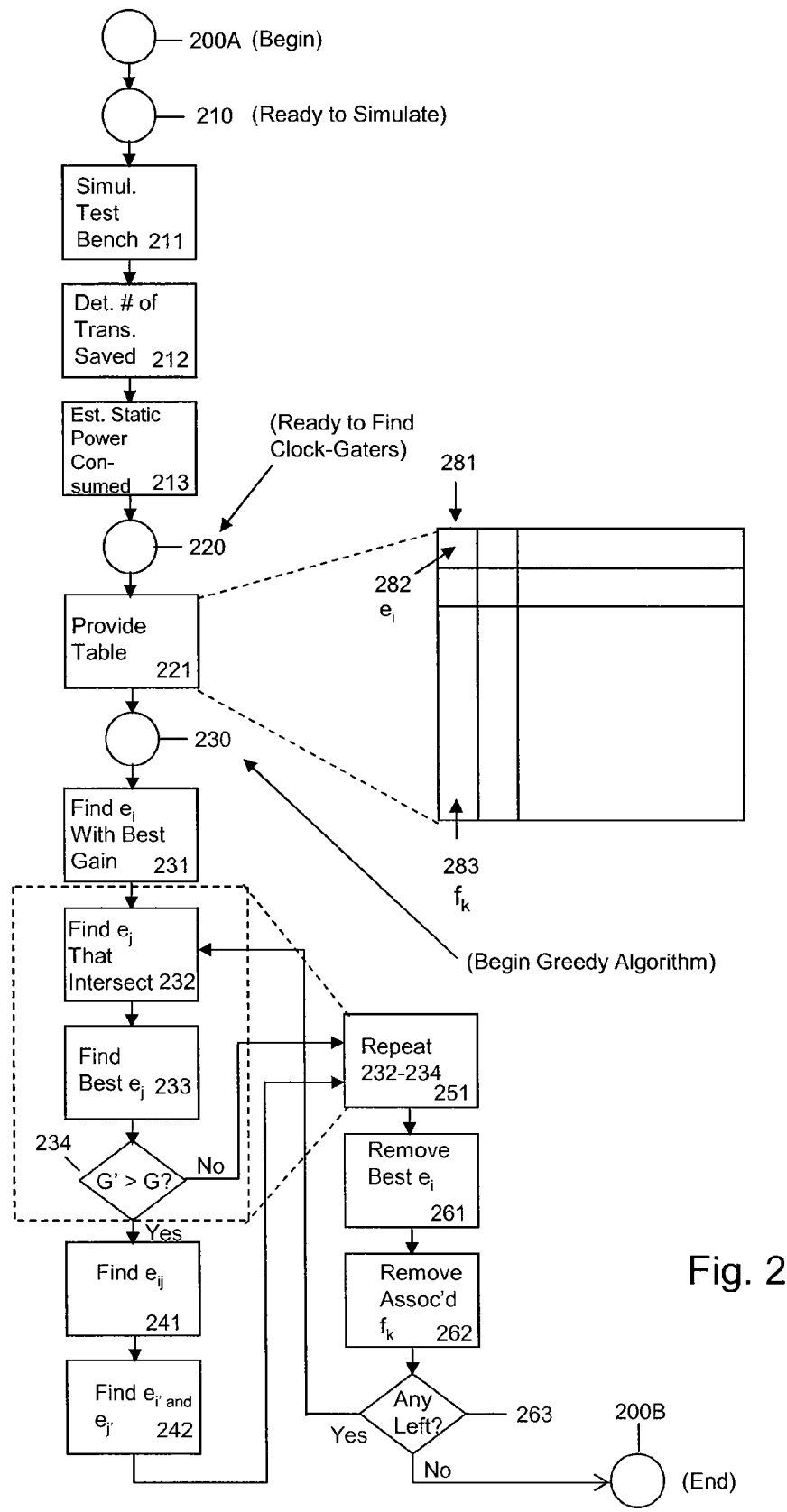

FIG. 2 shows a conceptual diagram of a method.

After reading this application, those skilled in the art would recognize that the method 200 can be performed by a computing device, such as one including a processor and memory or mass storage, and including a removable memory for reading or writing physical media having data or instructions related to the method 200. For example and without limitation, those data or instructions might include instructions capable of being interpreted by a computing device as instructions or data for performing the method 200.

A method 200 includes flow labels and method steps as shown in the FIG. 2, including at least the following:

A flow label 200A indicates a beginning of the method 200.

A flow label 210 indicates that the method 200 is ready to (optionally) perform simulation for the selected circuit design 110. Performing simulation is optional, as it might occur that the method 200 receives simulation data from another source, such as from the supplier of the selected circuit design 110.

At a step 211, the method 200 determines one or more responses of the selected circuit design 110 to one or more simulation "test bench" sets of inputs.

In one or more such cases, the method 200 uses a circuit simulator to provide at least approximate probabilities, for each node in the selected circuit design 110, of that node being equal to logical value 0 or logical value 1 when tested. The circuit simulator might also provide at least approximate numbers, for the input and output values for each node, of that node transitioning from logical value 0 to logical value 1, or the reverse.

The responses of the selected circuit design 110 might be saved for later use, or might be used in further method steps shown in the FIG. 2.

As shown herein, the method 200 generally attempts to optimize a total number of transitions as a proxy for an amount of power measurement. The actual amount of power measurement would likely depend on the capacitances of cells and wires, which are not generally known at the time the method 200 is performed.

Although this application provides greater detail regarding embodiments in which the number of transitions is used as a proxy for an amount of power measurement, there is no particular reason to limit any part of this application in this regard.

At a step 212, the method 200 determines a number of such transitions that would be saved, for each possible enable signal e, i.e., signal to enable one or more flip-flops 111. In one or more cases, the number of such transitions that would be saved can be expressed as:

$$G = Pr(e=0) N_{cycles} N_{flops} + \Sigma_{(redundant\ P)}(N_{trans}\ at\ P) - (N_{trans}\ of\ HW_{new}) \quad (291)$$

where, in equation (291),

G=total reduction in number of transitions;

Pr(e=0)=approximate probability (or a proxy for approximate probability) of the enable signal e being off;

$N_{cycles}$=number of cycles for the simulated circuit operation;

$N_{flops}$=number of flip-flops disabled/enabled by the enable signal e;

$\Sigma_{(redundant\ P)}(N_{trans}\ at\ P)$=sum, for all redundant pins P that can be removed in response to one or more such enable signals e; of the number of transitions at each such pin P;

and $N_{trans}$ of $HW_{new}$=number of transitions added by new hardware, i.e., clock gating elements 120 and possibly other logic circuitry 130.

For example and without limitation, if $HW_{new}$ includes just a single ICG, $N_{trans}$ at P (clock pin of the ICG)=$N_{trans}$ for the main clock signal at that clock cycle;

$N_{trans}$ at P (enable pin of the ICG)=$N_{trans}$ for the enable signal e;

and $N_{trans}$ of $HW_{new}$=number of transitions added by the ICG, which can be estimated from a library definition of the ICG.

Static Power Savings

At a step 213, the method 200 estimates an amount of static power consumption that is reduced by inclusion of the clock gating elements 120 and possibly other logic circuitry 130 in the selected circuit design 110.

In one or more cases, the amount of such static power consumption can be expressed as a selected fraction, e.g., a known percentage, of the amount of dynamic power consumption. For example and without limitation:

$$G_{static} = F_{static}[\Sigma_{(redundant\ P)}(N_{trans}\ at\ P) - (N_{trans}\ of\ HW_{new})] \quad (292)$$

where, in equation (292),

G=total reduction in static power consumption;

$F_{static}$=a selected fraction, e.g., a fixed percentage, used for determining static power consumption;

$\Sigma_{(redundant\ P)}(N_{trans}\ at\ P)$=as in equation (291);

and $N_{trans}$ of $HW_{new}$=as in equation (291).

For example and without limitation, if an input pin P for an AND gate is removed (or added), $F_{static}$ can be set equal to 1.0 when that input pin P is switched at a selected frequency, which, for selected clock gating elements 120 and possibly other logic circuitry 130, can be estimated from a library definition.

Selecting ICG's

A flow label 220 indicates that the method 200 is ready to find an optimal (or near-optimal) set of clock gating elements 120, and possibly other logic circuitry 130, to build in response to the determined gain (G) from each enable signal e.

At a step 221, the method 200 provides a table 281, in which each row 282 of the table 281 indicates a possible enable signal e, and in which each column 283 of the table 281 indicates a possible flip-flop 111 in the selected logic circuit no. In one or more cases, the table 281, with its rows 282 and columns 283, might be implemented using a sparse matrix data structure with a computing device using memory or mass storage. However, in the context of the invention, there is no particular requirement for any such limitation.

At a step 222, the method 200 computes, for each row 282 of the table 281, a total gain (G), i.e., $G_{row}$, as described above with respect to the sum of equation (291) and equation (292).

In one or more cases, the method 200 proceeds using a greedy algorithm to select a set of possible enable signals e. However, in the context of the invention, there is no particular requirement for using this particular algorithm, or for any other such limitation.

Greedy Algorithm

A flow label 230 indicates that the method 200 is ready to begin the greedy algorithm.

At a step 231, the method 200 finds the row 282 $e_i$ with substantially the best gain (i.e., highest value of G for that row 282 $e_i$).

At a step 232, the method 200 finds substantially all rows 282 $e_j$ which have non-null intersection with the row 282 $e_i$, i.e., row 282 $e_i$ and row 282 $e_j$ have at least one column 283 $f_k$ in common.

At a step 233, the method 200 finds the row 282 $e_j$ with substantially the best gain increase, if combined with the row 282 $e_i$. In one or more cases, the gain increase can be expressed as:

$$G'=G_{combined}(e_i,e_j)+G(\text{remaining } e_i) \quad (293)$$

where, in equation (293), $G_{combined}(e_i, e_j)$=G ($e_1$) as in equation (291), where $e_1$=all $f_k$ gated by ($e_i$ AND $e_j$), possibly adjusted using $G_{static}$ ($e_1$) as in equation (292);

G (remaining $e_i$)=G ($e_2$) as in equation (291), where $e_2$=all $f_k$ gated by all $e_i$, having a null intersection with $e_j$, possibly adjusted using $G_{static}$ ($e_2$) as in equation (292); and $Pr([e_i \text{ AND } e_j]=0)=Pr(e_i=0)+Pr(e_j=0)-[Pr(e_i=0)Pr(e_j=0)]$ (approximately).

At a step 234, the method 200 determines if G'($e_i$, $e_j$)>G ($e_i$).

If so, the method 200 proceeds with the step 241, where the rows 282 $e_i$ and $e_j$ are combined.

If not, the method 200 proceeds with the step 251, where it determines whether there are any other combinations of rows 282 $e_i$ and $e_j$ using $e_i$.

Removing Intersecting Rows

At a step 241, the method 200 provides a new row 282 $e_{ij}$=[$e_i$ AND $e_j$].

At a step 242, the method 200 adds the new row $e_{ij}$ to the table 281.

At a step 251, the method 200 repeats the step 232 through the step 234, i.e., the method 200 finds if there are any further rows 282 $e_{j'}$ for which G'($e_{ij}$, $e_{j'}$)>G($e_{ij}$).

After reading this application, those skilled in the art would recognize that the step 231 need not be performed, as the new row 282 $e_{ij}$ is already known to have substantially the best gain.

If there are any such further rows 282 $e_{j'}$, the method 200 proceeds with the step 241, where a new intersecting row is provided.

If there are not any such further rows 282 $e_{j'}$, the method 200 proceeds with the step 261, where it removes the substantially best-gain row 282 $e_{ij}$ (or just $e_i$ if no $e_j$ was found for that $e_i$).

At a step 261, the method 200 removes the substantially best-gain row 282 $e_{ij}$ (or just $e_i$).

At a step 262, the method 200 removes all columns 283 $f_k$ gated by the substantially best-gain row 282 $e_{ij}$ (or just $e_i$).

At a step 263, the method 200 determines if there are any rows 282 left after removing the substantially best-gain row 282 $e_{ij}$ (or just $e_i$).

After reading this application, those skilled in the art would recognize that the step 263 might compare any remaining rows 282 with a minimum threshold $g_\theta$, i.e., those remaining rows 282 $e_i$ for which G($e_i$)>$g_\theta$ (versus those remaining rows 282 $e_i$ for which G($e_i$)>0). In such cases, the method 200 determines that "any rows 282 left" is a null set if there are no remaining rows 282 $e_i$ for which G($e_i$)>$g_\theta$.

If there are any such rows 282 left, the method 200 proceeds with the step 232, where the method 200 proceeds to find if there are any further rows 282 $e_j$ for which G'($e_{i'}$, $e_j$)>G($e_{i'}$).

If there are no such rows 282 left, the method 200 proceeds with the flow label 200B, where the method 200 ends.

End of Method

A flow label 200B indicates an end of the method 200.

After reading this application, those skilled in the art would recognize that other factors might be considered in the selection of clock gating elements 120. These other factors that might be considered include the relative closeness of the dependent flip-flops to the selected nodes, and the like.

Alternative Embodiments

After reading this application, those skilled in the art would recognize that the scope and spirit of the invention includes other and further embodiments beyond the specifics of those disclosed herein, and that such other and further embodiments would not require new invention or undue experimentation.

The invention claimed is:

1. A method, including steps of:
   identifying information sufficient to describe a set of clock gating elements for a set of circuit elements; and
   determining a set of transformations to apply to those circuit elements, with the effect that those clock gating elements are applied to those circuit elements with substantially optimal power reduction for that set of circuit elements, wherein
   that step of determining includes steps of:
      transforming that information into a data structure having properties of identifying those circuit elements which are responsive to those clock gating elements; and
      identifying those clock gating elements to which those circuit elements are responsive, wherein
      that step of identifying includes steps of:
         identifying a first clock gating element with substantially the best power reduction for that set of circuit elements; and
         identifying a second clock gating element with substantially the best gain increase when combined with that first clock gating element; and in response to those steps of identifying, combining a first data structure associated with that first clock gating element with a second data structure associated with that second clock gating element.

2. A method as in claim 1, including steps of providing a data structure responsive to a substantial intersection of that first data structure associated with that first clock gating element and that second data structure associated with that second clock gating element.

3. A method as in claim 1, including steps of removing one or more data structures responsive to that first clock gating element with that substantially best power reduction.

4. A method as in claim 1, wherein that substantially best gain increase is responsive to at least one of the following:
   a combined power reduction for that first clock gating element and that second clock gating element, and
   a power reduction for those clock gating elements other than that first clock gating element.

5. A method as in claim 1, wherein that substantially best power reduction is responsive to a multi-element cost function.

6. A method as in claim 1, wherein that substantially best power reduction is responsive to at least two of the following:
   an approximate probability, or proxy thereof, for a number of transitions saved by that first clock gating element;
   an approximate sum, or proxy thereof, for a number of redundant pins that can be removed responsive to that first clock gating element; and
   that approximate sum, or proxy thereof, for that number of transitions that are added responsive to that first clock gating element.

7. A method in claim 1, wherein those steps of identifying that second clock gating element include steps of examining one or more clock gating elements with substantially non-null intersection with that first clock gating element.

8. A method as in claim 1, wherein that data structure includes:
   one or more substructures identifying those circuit elements responsive to those clock gating elements, and
   one or more substructures identifying those clock gating elements to which those circuit elements are responsive.

9. A method as in claim 1, wherein that data structure is capable of being substantially addressable as a matrix, wherein
   substantially each of those circuit elements is identified with one of:
      a row or column, and wherein
   substantially each of those clock gating elements is identified with one of:
      a column or row.

* * * * *